F. A. PLUMMER.
PROCESS AND APPARATUS FOR ACTING UPON MILK.
APPLICATION FILED APR. 28, 1920.
1,430,403.
Patented Sept. 26, 1922.
4 SHEETS—SHEET 2.
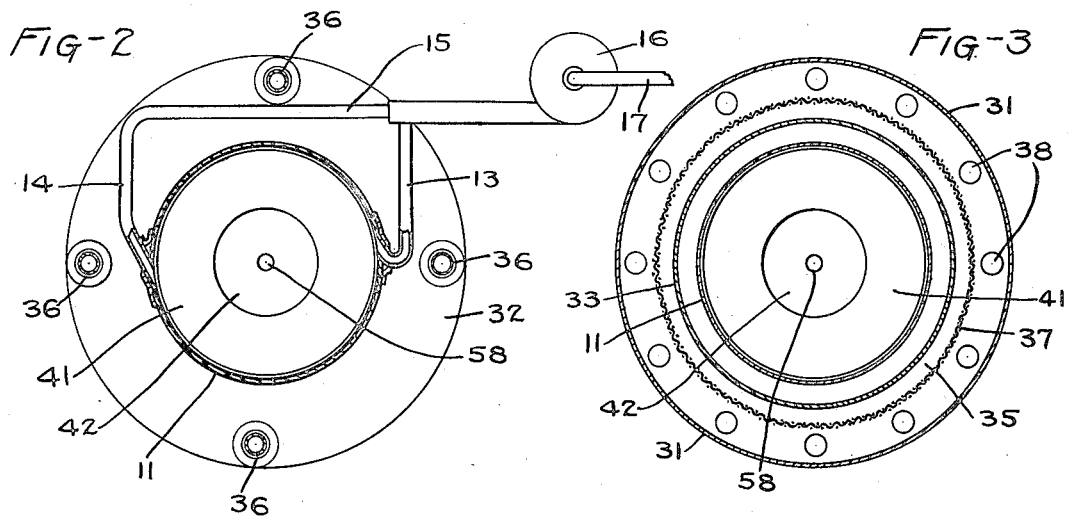
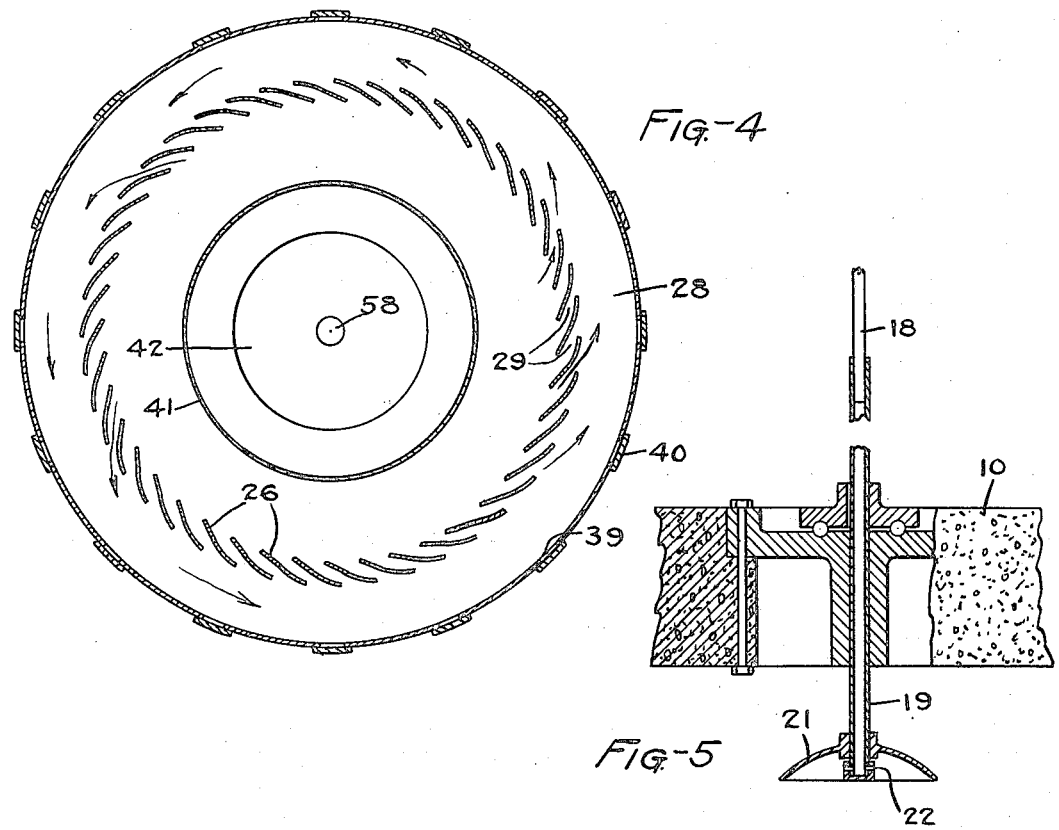
INVENTOR:
FREDERICK A. PLUMMER.
BY Whiteley and Ruckman
ATTORNEYS.

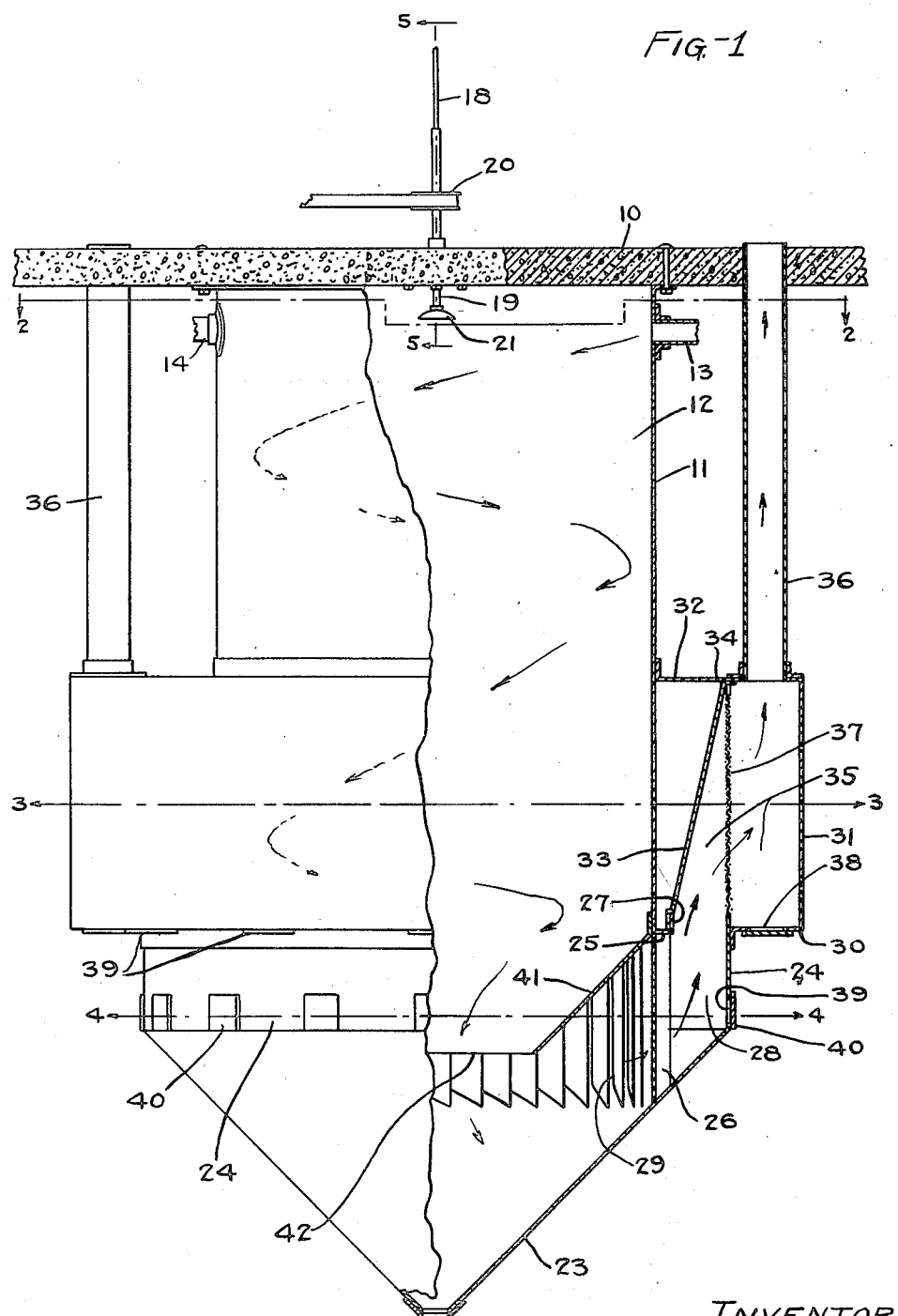

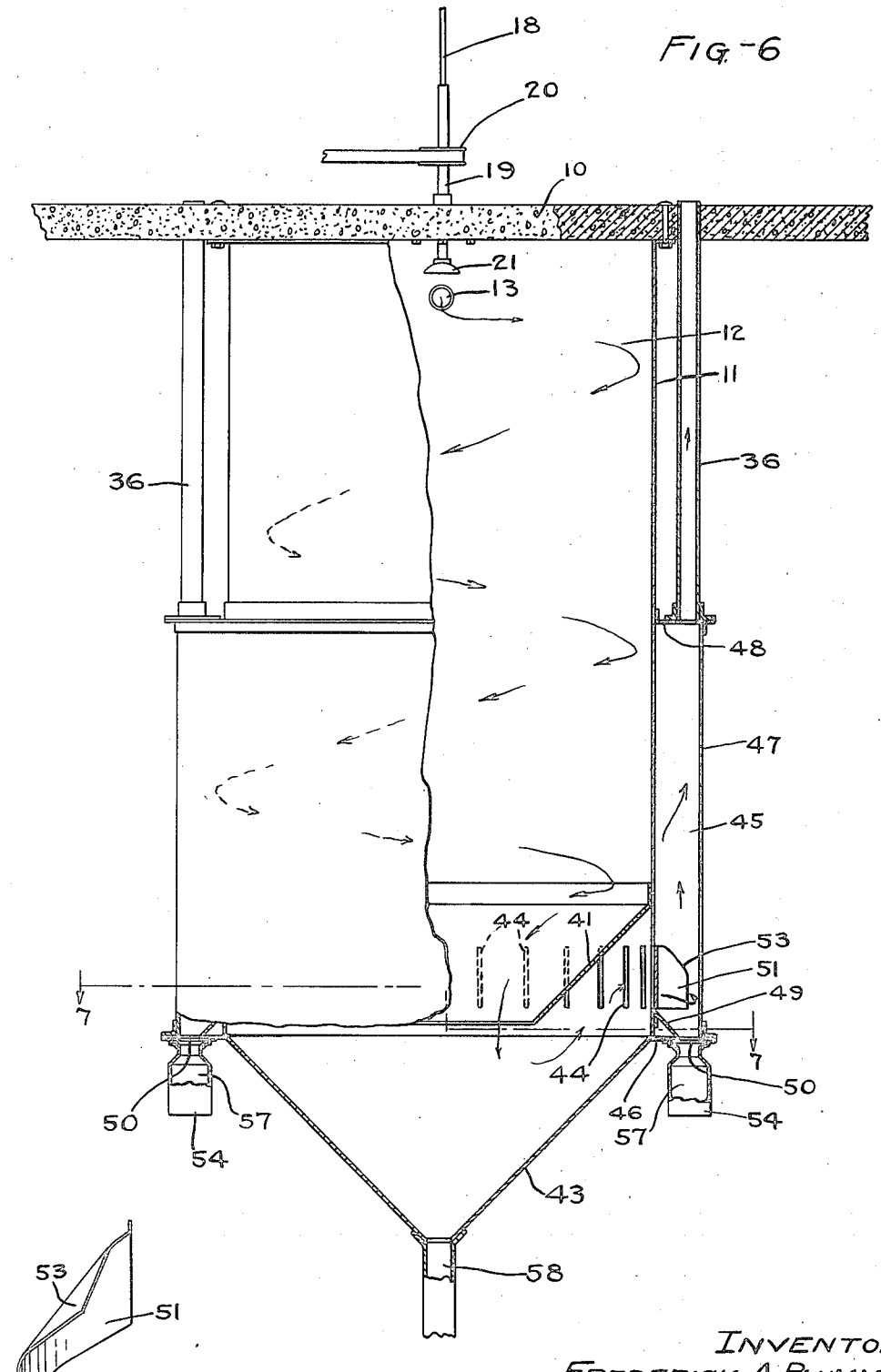

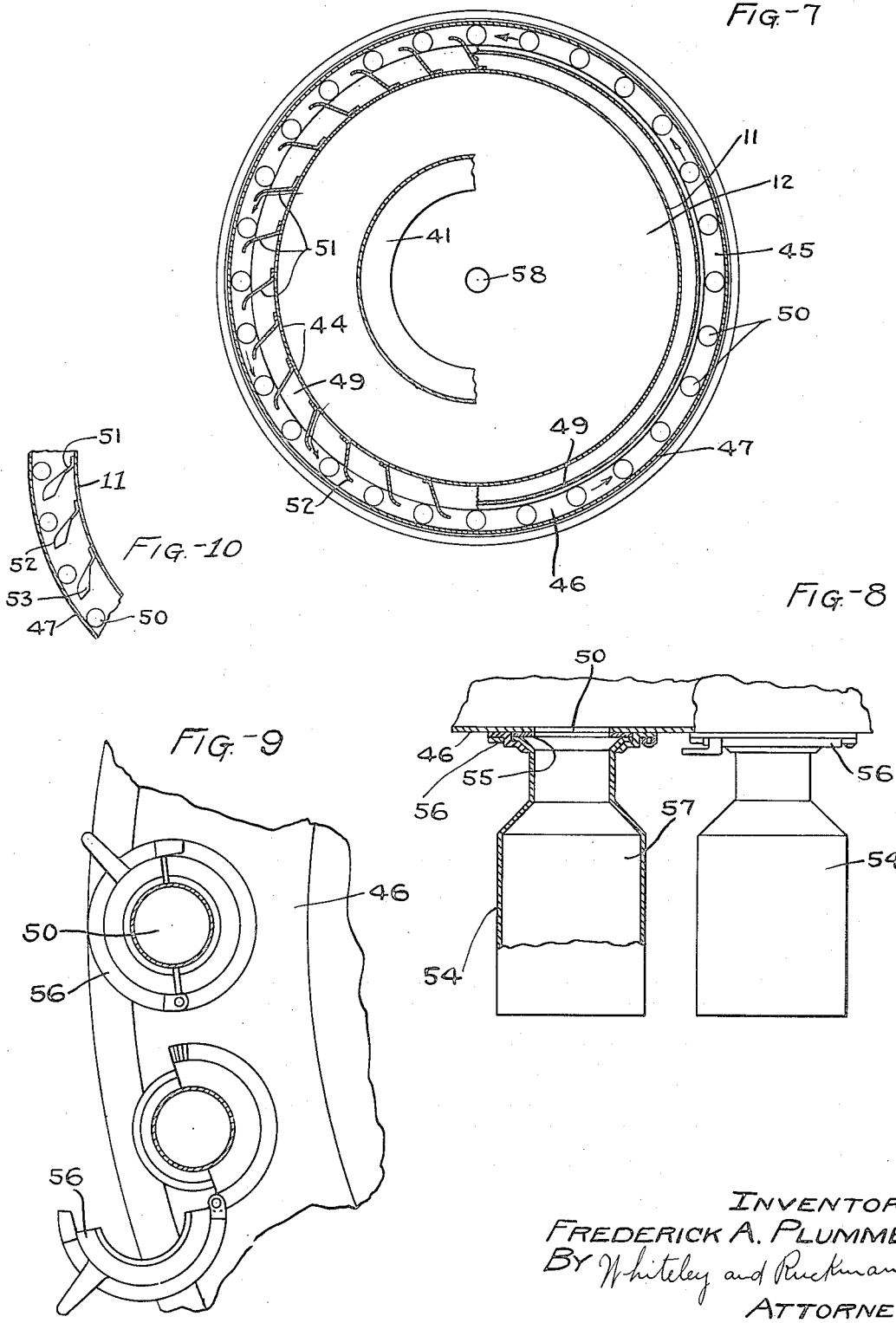

Patented Sept. 26, 1922.

1,430,403

UNITED STATES PATENT OFFICE.

FREDERICK A. PLUMMER, OF MINNEAPOLIS, MINNESOTA, ASSIGNOR OF ONE-HALF TO ARTHUR DORLAND GRAY, OF CHICAGO, ILLINOIS.

PROCESS AND APPARATUS FOR ACTING UPON MILK.

Application filed April 28, 1920. Serial No. 377,312.

*To all whom it may concern:*

Be it known that I, FREDERICK A. PLUMMER, a citizen of the United States, residing at Minneapolis, in the county of Hennepin and State of Minnesota, have invented certain new and useful Improvements in Processes and Apparatus for Acting upon Milk, of which the following is a specification.

My invention relates to a process and apparatus for acting upon milk, either whole milk or skimmed milk, to produce a condensation of the same or to reduce the same to a form of dry powder and to recover said condensed milk or powder without loss by reason of the reduction or powdering process.

The means of my invention are of primary use in conjunction with a process and apparatus heretofore used whereby milk is sprayed into the top of a vertical cell of suitable dimensions and said milk spray is subjected to currents of heated air which are thereafter withdrawn from the cell, said heated air taking with it some or all of the water content of the milk. In practice the original whole milk may first be sprayed into such a cell and subjected to heated air with the result that a portion of the water content of that milk will be withdrawn and the remaining product in a condensed form will accumulate at the bottom of the cell. This condensed product will then be subjected to a second treatment in another cell which will withdraw all of the moisture from the sprayed condensate and the product resulting will accumulate in the form of a dry powder within the cell. In each step of this process as heretofore practised there has been material loss of the product which passes out of the apparatus with the heated air. This is due to the fact that in both steps, even that in which complete removal of moisture does not take place, much very fine powder is formed which powder is carried off by the current of air when strainers or so-called breather cloths are employed.

It is an object of my invention to provide means for controlling the current of air at the time and after it leaves the cell, such that complete precipitation and removal of any milk in the current of air either in the form of powder or spray will be effected.

In accomplishing this object I provide a supplemental chamber near the bottom and surrounding the drying cell and introduce the drying air into said chamber at the bottom thereof. The means employed to effect this introduction are so constructed as to give to the air in the bottom of the supplementary chamber, which is preferably of circumferential or annular form, a rotating movement tending to throw any particles in the air outwardly so that the same will be precipitated at the bottom of the chamber. I further may provide within the second chamber a breather cloth, vertical in position, of very large area, and so positioned in the second chamber that the air will move through said breather cloth at a very much reduced rate of speed, thus preventing any tendency for particles of material to go through.

The full objects and advantages of my invention will appear in connection with the detailed description thereof and the novel features are particularly pointed out in the claims.

In the drawings illustrating the application of my invention in two forms,—

Fig. 1 is an elevation view in part section of one form of my invention. Fig. 2 is a reduced sectional plan view on line 2—2 of Fig. 1. Fig. 3 is a reduced sectional plan view on line 3—3 of Fig. 1. Fig. 4 is a sectional plan view on line 4—4 of Fig. 1. Fig. 5 is an enlarged sectional view of the spraying feed mechanism. Fig. 6 is a part section elevation view of another form of my invention. Fig. 7 is a plan view on line 7—7 of Fig. 6. Figs. 8 and 9 are part sectional elevation and plan views showing the manner of attachment of the recovering means applied to the apparatus of Fig. 6. Fig. 10 is a fragmentary sectional view. Fig. 11 is a view in perspective of one of the plates appearing in Fig. 10.

Supported from a floor or set of beams 10 by any suitable means is a shell 11, preferably cylindrical, of suitable size forming therein a cell 12. Pipes 13, 14 running from a feeder 15 and entering the cell 12, as indicated, convey air forced by a blower 16 which draws the heated air through a pipe 17 from any suitable heating means, this heated air within the cell 12 being caused to move in a cyclone within said cell. Milk, either in its natural state or after the same has been condensed by the removal of a portion of its water content, passes through a pipe 18 into a rotating feeder tube 19 driven by a pulley 20 operated from any suitable source of power. The feeder tube 19 carries a downwardly-turned disc 21 upon which the milk is forced from tube 19 through apertures 22 leading to said tube, and the milk is thrown by centrifugal action from the edge of said rotating disc in a finely divided state and enters the cyclonic current of air where it is subjected to the drying action thereof.

Below the lower edge of the shell 11 and spaced therefrom a suitable distance is a funnel-shaped hopper 23 the walls of which extend a considerable distance beyond the vertical plane of the walls of shell 11 and are joined to an annular shell 24 the upper part of which surrounds concentrically the lower part of shell 11, providing an annular chamber or passageway about said shell. A horizontal annular lip 25 extends from the bottom of the shell 11 toward the annular wall 24, and between the lip 25 and the wall of hopper 23 are positioned a multiplicity of obliquely-disposed vertical blades 26 of the general cross-sectional shape shown in Fig. 4, being preferably slightly curved on their inner side. From the top of the ledge 25 is a vertical wall 27. There is thus formed between the outer portion of wall of hopper 23, wall 24 and blades 26 and walls 27 an annular chamber 28 into which the air from the cell 12 passes through openings 29 between the obliquely-disposed blades 26. Because of the obliquity of these blades and the curvature thereof, the air passing through the openings 29 will be given a rotating movement within annular chamber 28. Surrounding the upper portion of wall 24 is a horizontal annular lip or bottom wall 30 to which is connected a cylindrical vertical wall 31. Closed at its top by an annular top wall 32 which may be secured directly to the shell 11, an obliquely-disposed wall 33 extends from the top of wall 27 to a point indicated at 34 on top wall 32 providing an enlarged extension 35 of annular chamber 28. A multiplicity of pipes 36 lead from the top wall 32 through which the heated air is finally discharged from the apparatus. An annular breather cloth 37, preferably of very fine mesh silk, extends vertically from the top of the wall 24 to the top of the oblique partition 33. This breather cloth is of very large area, and the area of passageway 28 is also large, so that the air passing through the breather cloth will necessarily be at a low speed, which will prevent any particles of solids carried with the air being drawn through the breather cloth. Apertures 38 in wall 30 which are closed by doors 39 give entrance into the chamber 35, and similar apertures 39 in wall 24 closed by doors 40 give access to the chamber 28 by which the breather cloth or screen 37 may from time to time be cleaned. Extending inwardly from the interior of shell 11 near the bottom thereof and parallel with the wall of hopper 23 is a funnel-shaped partition 41 which provides a reduced opening 42 from chamber 12 into the hopper 23. This causes the cyclone of air within chamber 12 to concentrate at the center of said chamber, and particularly over the center of hopper 23 into which the solids carried by said cyclone are deposited, the air then leaving the cyclone and passing to the passageways 29 will be comparatively free of solid matter before going through said passageways. A second cyclone of greater speed is then produced by the travel of the air through said obliquely-disposed passageways, which cyclone in the annular chamber 28 throws to the outside of said chamber and precipitates practically all solids carried in the air into chamber 28 before the air comes in contact with the breather cloth 37, the net result of these arrangements and the several steps of this process being to free the air entirely from any solids carried thereby before said air is discharged from the apparatus.

As illustrated in Fig. 6, a hopper 43 is secured directly to the bottom wall of the shell 11, which shell has therein above hopper 43 and between the wall thereof and the funnel-shaped partition 41 a multiplicity of narrow slit-like openings 44 which openings extend into an annular chamber 45 surrounding the lower portion of shell 11 and formed by a bottom wall 46, a cylindrical side wall 47 and a top wall 48, the discharge pipes 36 leading from chamber 45 from the top wall 48 as in the form shown in Fig. 1. A sloping partition 49 extends in annular relation from the shell 11 to a point about midway of the bottom wall 46, and said bottom wall between partition 49 and wall 47 is provided with a multiplicity of circular apertures 50 for a purpose which will be pointed out later. Within the annular chamber 45 and extending inwardly from the wall of shell 11 in oblique relation thereto are a multiplicity of plates 51, each plate being provided immediately in front of one of the openings 44 and having a curved end 52 as clearly indicated in Fig. 7. The several plates 51, which may be of sheet metal, are in parallel arrangement and have the upper corners turned over in a horizontal position as indicated at 53. The effect of this arrangement is to cause a cyclone of air at relatively high speed to be formed in and directed toward the bottom of chamber 45, thus causing all particles of material however fine to be thrown by centrifugal force outwardly and to gravitate downwardly to the apertures 50. Below apertures 50 are suspended collecting receptacles 54 which may be ordinary tin milk cans, and are held against a rubber gasket 55 by means of a clamping ring 56, thus being sealed airtight so that the interior 57 of receptacle 54 in fact provides a dead-air chamber for the reception of the solids carried by the rotating current or cyclonic current of air in annular chamber 45.

It will be noted that in this form of my invention the openings 44 are so small relative to the aggregate inlet area of pipes 13 that the air will pass through said openings 44 at relatively high velocity, which in conjunction with the obliquely-disposed plates 51 will cause in the lower part of chamber 45 a cyclone or whirl of a comparatively high degree of velocity. This cyclone is primarily directed slightly downward and of course must thereafter turn away and upwardly, where the air drifts through chamber 45 to passage 36 and is discharged. The particles of milk powder in the said cyclone will be precipitated outwardly and downwardly and will ultimately pass through the openings 50 into the cans 54. These cans being readily removable may be periodically withdrawn and empty cans supplied and the collected product discharged from the cans. A spout 58 discharges material collected in hopper 23 or 43.

The method of operation of my construction has been quite fully pointed out in the foregoing specification. The primary advantages consist in the process of handling the air containing the product, whether fully or only partially dried, whereby the said current of air is introduced at the top of the cell and is or may be caused to circulate through the cell in the form of a cyclone from the top to the bottom and is withdrawn at the bottom of the cell into a second chamber surrounding the cell wherein any products carried by the air are separated from the air, primarily by direct action of centrifugal force and gravity, and secondarily, in one form of the invention, by passing through a breather cloth of such large extent and in a passageway of such large area that the rate of movement of the air will be under too low a velocity to carry through any particles suspended in the air.

I claim:

1. The process of producing and collecting dried products of liquid substances which consists in introducing the liquid in a finely divided state at the top of a vertical cell, introducing heated air at the top of said cell, withdrawing the heated air and suspended material at the bottom of the cell at a multiplicity of points around the bottom of the cell, and introducing the withdrawn air into a second chamber surrounding the cell in such manner that said withdrawn air will rotate in said chamber causing precipitation of solids carried by the withdrawn air through the action of centrifugal force and gravity.

2. The process of producing and collecting dried products of liquid substances which consists in introducing the liquid in a finely divided state at the top of a vertical cell, introducing heated air at the top of said cell, withdrawing the heated air and suspended material at the bottom of the cell at a multiplicity of points around the bottom of the cell, introducing the withdrawn air into a second chamber surrounding the cell in such manner that said withdrawn air will rotate in said chamber causing precipitation of solids carried by the withdrawn air through the action of centrifugal force and gravity, and thereafter causing the air to move through a breather cloth within the second chamber of such extended area that the rate of movement of the air through the breather cloth will be at very slow velocity.

3. The process of producing and collecting dried products of liquid substances which consists in introducing the liquid in a finely divided state at the top of a vertical cell, introducing heated air at the top of said cell in such manner as to cause the air and suspended material to move in a cyclone within the cell, withdrawing the heated air at the bottom of the cell at a multiplicity of points around the bottom of the cell, and introducing the withdrawn air into a second chamber surrounding the cell in such manner that said withdrawn air will rotate in said chamber causing precipitation of solids carried by the withdrawn air through the action of centrifugal force and gravity.

4. An apparatus for producing and collecting dried products of liquid substances which consists in a casing forming a vertical cell, a second casing forming a chamber surrounding the bottom of said cell, there being openings at a multiplicity of points around the bottom of the cell and into said chamber, means for introducing finely divided liquid at the top of the cell, means for introducing air in tangentially-oblique currents into the top of the cell whereby the air and suspended material are caused to move downwardly through the cell in a cyclone and to discharge through said openings into the second chamber, and means associated with said openings for causing the air in the second chamber to continue its cyclonic movement whereby the solids in the air are acted upon by centrifugal force and gravity and are thereby separated from the air.

5. An apparatus for producing and collecting dried products of liquid substances which consists in a casing forming a vertical cell, a second casing forming a chamber surrounding the bottom of said cell, there being openings at a multiplicity of points around the bottom of the cell and into said chamber, means for introducing air and finely divided liquid at the top of the cell, whereby the air and suspended material are caused to move downwardly through the cell and discharge through said openings into the second chamber, and a multiplicity of fins or plates, each plate extending from one of said openings into the chamber tangentially for causing the air and suspended material in the second chamber to whirl.

6. An apparatus for producing and collecting dried products of liquid substances which consists in a casing forming a vertical cell, a second casing forming a chamber surrounding the bottom of said cell, there being openings at a multiplicity of points around the bottom of the cell and into said chamber, means for introducing air and finely divided liquid at the top of the cell, whereby the air and suspended material are caused to move downwardly through the cell and discharge through said openings into the second chamber, and a multiplicity of fins or plates each plate extending from one of said openings into the chamber tangentially for causing the air and suspended material in the second chamber to whirl, the upper portion of said plates being curved over horizontally to cause the cyclone or whirl to move outwardly and downwardly.

7. An apparatus for producing and collecting dried products of liquid substances which consists in a casing forming a vertical cell, a second casing forming a chamber surrounding the bottom of said cell, there being openings at a multiplicity of points around the bottom of the cell and into said chamber, means for introducing air and finely divided liquid at the top of the cell, whereby the air and suspended material are caused to move downwardly through the cell and discharge through said openings into the second chamber, and means in the second chamber having cooperative arrangement with reference to each of said openings for directing the air after it passes through said openings so that the same will move in a cyclone in the outer and lower portion of said second chamber whereby the solids in the air are acted upon by centrifugal force and gravity and are thereby separated from the air.

8. An apparatus for producing and collecting dried products of liquid substances which consists in a casing forming a vertical cell, a second casing forming a chamber surrounding the bottom of said cell, there being openings at a multiplicity of points around the bottom of the cell and into said chamber, means for introducing air and finely divided liquid at the top of the cell, whereby the air and suspended material are caused to move downwardly in a helical path through the cell and discharge through said openings into the second chamber, means associated with said openings for causing the air in the second chamber to whirl or rotate whereby the solids in the air are acted upon by centrifugal force and gravity and are thereby separated from the air, and a breather cloth in the second chamber extending entirely around the cell and of large area whereby the air will pass through said breather cloth to discharge from the said chamber at very low velocity.

9. An apparatus for producing and collecting dried products of liquid substances which consists in a casing forming a cylindrical vertical cell, a second casing forming an annular chamber surrounding the lower portion of said cell, there being openings at a multiplicity of points around the bottom of the cell and into said chamber, a funnel-shaped member extending inwardly from the inner wall of said cell at a point above said openings and forming a contracted opening at the center of the cell within the circle of said openings, means for introducing finely divided liquid at the top of the cell, means for introducing air in tangentially oblique currents into the top of the cell whereby the air and suspended material are caused to move downwardly through the cell in a cyclone and to pass through said contracted opening, thence to discharge through said first-named openings into the annular chamber, and means associated with said openings for causing the air to whirl or rotate about the annular chamber whereby the solids in said air are acted upon by centrifugal force and gravity and are thereby separated from the air.

10. An apparatus for producing and collecting dried products of liquid substances which consist in a casing forming a vertical cell, a second casing forming an annular chamber surrounding the bottom of said cell, the upper portion of said second casing being enlarged to form a second annular chamber of greater circumference than said first mentioned annular chamber, a breather cloth separating said annular chambers, the bottom of said vertical cell being in communication with said first-mentioned annular chamber, and means for introducing air and finely divided material at the top of said cell.

11. An apparatus for producing and collecting dried products of liquid substances which consists in a casing forming a vertical cell, a second casing forming an annular chamber surrounding the bottom of said cell, the upper portion of said second casing being enlarged to form a second annular chamber of greater circumference than said first mentioned annular chamber, a breather cloth separating said annular chambers, the bottom of said vertical cell being in communication with said first mentioned annular chamber through a multiplicity of openings circumferentially arranged, a multiplicity of plates, each plate extending from one of said openings into said first-mentioned annular chamber tangentially and means for introducing air and finely divided liquid at the top of said cell.

In testimony whereof I hereunto affix my signature.

FREDERICK A. PLUMMER.